United States Patent [19]

Jacquemin

[11] 4,251,906
[45] Feb. 24, 1981

[54] METHOD OF AND APPARATUS FOR FITTING AND REMOVING UNPUNCTURABLE INNER TUBES

[75] Inventor: Paul Jacquemin, Les-Ches by Esbly, France

[73] Assignee: Etablissements M. Muller & Cie., Paris, France

[21] Appl. No.: 23,454

[22] Filed: Mar. 23, 1979

[30] Foreign Application Priority Data

Oct. 10, 1978 [FR] France .................................. 78 28877

[51] Int. Cl.$^3$ ......................... B23P 11/02; B23P 19/02
[52] U.S. Cl. ........................................ 29/451; 29/235; 29/426.6
[58] Field of Search ...................... 29/451, 235, 426.6; 157/1.11, 1.26, 11

[56] References Cited

U.S. PATENT DOCUMENTS 3,180,015 4/1965 Thompson et al. ............... 29/451 X
3,837,064 9/1974 Membre et al. ......................... 29/235

FOREIGN PATENT DOCUMENTS

531815 1/1941 United Kingdom ...................... 29/235

*Primary Examiner*—Charlie T. Moon
*Attorney, Agent, or Firm*—Michael J. Striker

[57] ABSTRACT

This invention provides a method of and an apparatus for fitting and removing a so-called unpuncturable inner tube with respect to a corresponding pneumatic tire. The inner tube is elongated and disposed in front of the tire held in a vertical position, and the lower front portion of the tube is introduced into the lower portion of the tire. The apparatus comprises a gantry-like frame structure for holding the tire vertically, and a movable carriage extending at right angles to the gantry and supporting a tiltable device comprising essentially two arms pivotally interconnected and adapted to elongate the inner tube. Removal of the inner tube is also feasible due to the provision of means for partially crushing the tire containing the inner tube until one portion of the tube projects into the central aperture of the tire from which it is then expelled by a push arm extension adapted to be fitted to the upper one of the pair of extension arms. The various inner-tube and tire engaging members of the apparatus are adjustable to accomodate a wide range of inner tube and tire sizes.

9 Claims, 11 Drawing Figures

METHOD OF AND APPARATUS FOR FITTING AND REMOVING UNPUNCTURABLE INNER TUBES

BACKGROUND OF THE INVENTION

1. Field of the Invention

This invention relates to so-called "unpuncturable" inner tubes equipping certain types of pneumatic tires of motor vehicles, and has specific reference to a method and an apparatus specially conceived for fitting and removing tubes of this character.

In fact, these inner tubes consist of a rubber tubular tube provided with transverse cells. Inner tubes to this type are used for equipping the tires of motor vehicles in which the risks of punctures are extremely high, or should be definitively avoided, as in the case of armored vehicles such as used by the army or the police, and also certain public works vehicles.

Due to the relatively large size of the tires equipping vehicles of this type, the corresponding inner tubes themselves are also bulky. Under these conditions, these inner tubes are extremely difficults to fit and remove, considering the volume of the tubes which cannot be reduced by deflation, as in the case of standard inner tubes.

2. Description of the Prior Art

Various devices incorporating means capable of altering the shape of the unpuncturable inner tube to be fitted by preliminarily crushing this tube have already been proposed in the art, together with handling means capable of subsequently introducing the inner tube into the corresponding tire. However, hitherto known devices of this type are not fully satisfactory and besides they are rather awkward to use. On the other hand, in general these known devices are designed for use with one or a few well-defined tire sizes, and they cannot be used with pneumatic tires of different sizes unless a number of their component elements are changed. Finally, these prior art devices are capable only of fitting the inner tube into the tire, but cannot be used for subsequently removing an unpuncturable inner tube of the type discussed herein.

SUMMARY OF THE INVENTION

In view of the foregoing, it is the essential purpose of the present invention to provide a method of and an apparatus for performing both operations indifferently, that is, fitting and removing the inner tube into and from the corresponding pneumatic tire. In addition, the method and apparatus of this invention can be used with a wide range of tires sizes, namely tires having a diameter of the order of 450 mm as well as tires having a diameter as large as 1750 mm. On the other hand, the apparatus according to this invention is so designed and constructed that it is particularly easy to operate for both fitting and removal operations.

The inner tube fitting method according to this invention is characterized essentially in that it comprises the steps of bringing the unpuncturable inner tube to be fitted in front of one side of the corresponding tire, extending the tube along an axis perpendicular to the general median plane of the tire, then while maintaining this extension, introducing the front portion of the tube into the adjacent lower portion of the tire, and finally pushing the opposite or upper end of the unpuncturable inner tube into the diametrally opposing or upper portion of the tire while releasing the extension force exerted until then on this tube.

Thus, the extension effort exerted on the inner tube during its introduction into the pneumatic tire reduces considerably the overall dimension of the tube in the transverse direction, so that the inner tube can pass through the corresponding aperture of the tire, and therefore the front portion of the unpuncturable inner tube can easily be inserted into the adjacent tire section.

The apparatus according to this invention for carrying out the method broadly set forth hereinabove is characterized in that it comprises in front of a gantry like frame structure adapted to hold the pneumatic tire in a vertical position a device for handling the inner tube to be fitted, this device comprising a pair of extension arms disposed in a plane perpendicular to the median plane of the tire and pivotally mounted on a carriage adapted to move in the direction towards the tire-holding frame structure, a series of separate control means for moving the arms away from each other, tilting the device and moving the carriage.

In operation, after engaging the outer ends of the two arms of the inner tube handling device into an unpuncturable inner tube, these arms can be opened or divaricated so that the fitting method described hereinabove can be carried out. then, by properly combining the forward movement of the carriage and the tilting movement of the pair of arms, one of the front ends of the inner tube can be introduced into the lower portion of the tire by pushing and guiding this one front end into the lower portion of the tire with the assistance of the lower arm of the pair, whereafter the opposite end of the inner tube is pushed in turn into the upper portion of the tire by means of the upper arm of the pair of arms of the device.

However, as already mentioned hereinabove, this apparatus is also designed for easily removing an unpuncturable inner tube from a tire. For this purpose, there is provided on the one hand a detachable push arm extension adapted to be fastened to one of the arms of the pair, and on the other hand means for partially crushing the tire on the tire-holding frame structure, so that one portion of the inner tube is caused to project into the central aperture of the tire. Thus, after positioning the push arm extension against this portion of the inner tube, the latter can be ejected very easily from the tire by simply moving the push arm forwards, i.e. by moving the carriage in the proper direction.

With the method and apparatus of this invention, removing an inner tube from a tire is a easy as fitting an unpuncturable inner tube into a tire.

Other features and advantages of the method and apparatus of this invention will appear as the following description proceeds will reference to the accompanying drawings.

BRIEF DESCRIPTION OF THE DRAWINGS

FIGS. 9 and 10 are similar views illustrating two successive steps of this tube removal.

DESCRIPTION OF THE PREFERRED EMBODIMENT

The apparatus comprises in combination:
on the one hand, a gantry-like frame structure 1 adapted to hold a pneumatic tire 2 in a vertical position, and
on the other hand, an inner tube handling device 3 adapted to introduce an unpuncturable inner tube 4 into the tire 2.

At its lower portion, the gantry 1 comprises an adjustable horizontal bed plate 5 mounted for vertical movement between the pair of lateral vertical uprights 6 of the gantry. This bed plate is adapted to receive the pneumatic tire 2 into which the unpuncturable inner tube 4 is to be introduced or fitted.

Figure 4:
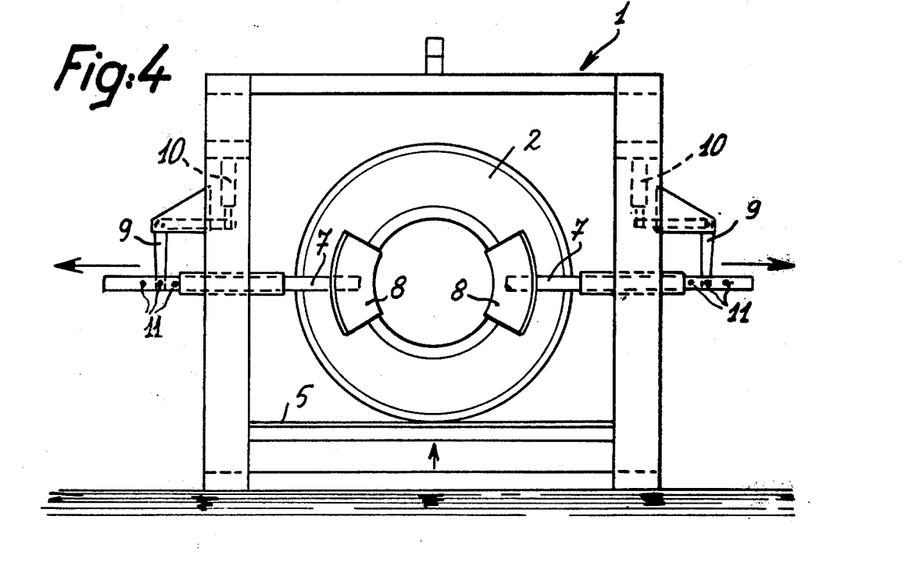
FIG. 4 is a front elevational view of the frame structure for holding the tire, after a tire has been positioned therein.

Mounted across these uprights 6 are horizontal sliding bars 7 carrying at their inner end a shaped plate 8 adapted to engage the inner edge or bead of the pneumatic tire 2, as illustrated in FIG. 4. The outer end of each bar 7 is coupled by means of a cranked lever 9 to a fluid-actuated control cylinder 10. Preferably, the corresponding end of each sliding bar 7 has a plurality of spaced holes 11 formed therethrough so that the position of the pivotal coupling between the corresponding cranked lever 9 and the bar 7 can be modified at will.

Assuming that a pneumatic tire 2 has been placed upon the adjustable bed plate 5, the latter is lifted by actuating another fluid-operated control cylinder (not shown) until the corresponding tire portion is level with the shaped plates 8 carried by bars 7. Then these plates 8 are properly positioned and the cylinders 10 are actuated in order to set these plates at their maximal relative spacing. Thus, the central aperture of the tire is elongated in the horizontal direction and the tire itself is firmly held in a vertical position.

The inner tube handling device 3 comprises on the other hand firstly an expansion system comprising a pair of pivoted arms or compasses of which the two arms 12 and 13 lie in a vertical plane perpendicular to the median plane of the tire 2 held in a fixed position in the gantry frame 1. These arms 12, 13 are tiltably mounted on a double vertical A-frame 14 supported by a carriage 15. This carriage 15 is movable in one or the other direction shown by the double-headed arrow F at right angles to the general plane of the gantry frame 1. To this end, the carriage 15 is slidably mounted inside a horizontal frame 16 acting as a fixed chassis to the assembly and its movements are controllable by means of a fluid-actuated cylinder 17.

The lower arm 12 of the compasses is pivoted about a fulcrum pin 18 carried by the A-frame 14. The arms 12, 13 can be tilted bodily about this fulcrum by means of a pair of links 19 controlled by means of a cylinder 20 attached on the one hand to the central pivot pin of this pair of links and on the other hand to a fixed point of the A-frame 14, the two links being pivoted, on the other hand, the one to the carriage 15 and the other to the lower arm 12 of the extension system.

The two arms of this system are pivoted to each other by means of a pivot pin 21. Their relative angular spacing may be modified by means of another pair of links 22 controlled by a fluid-actuated cylinder 23 reacting on the common pivot pin 21 of the two arms 12, 13, the piston rod of this cylinder 23 having its outer end pivotally connected to the intermediate pivot pin 24 of links 22. The upper arm 13 of the extension system comprises a telescopic extension-piece 25 responsive to another fluid-actuated cylinder 26 incorporated in this arm (see FIG. 3). However, the two arms 12 and 13 of this extension system are adapted to receive claws 27 and 28 at their outer ends, respectively. Each claw is etachably mounted on the corresponding arm end.

For this purpose, one claw 27 is provided with an integral shank adapted to fit into the hollow end portion of the lower arm 12 and to be locked in the selected position by means of a bolt controlled by a hand lever 29. The other claw 28 of the upper arm 13 is also provided with a shank adapted to engage the outer end of the extension-piece 25 and to be locked therein by means of a bolt responsive to a hand lever 30.

Figure 1:
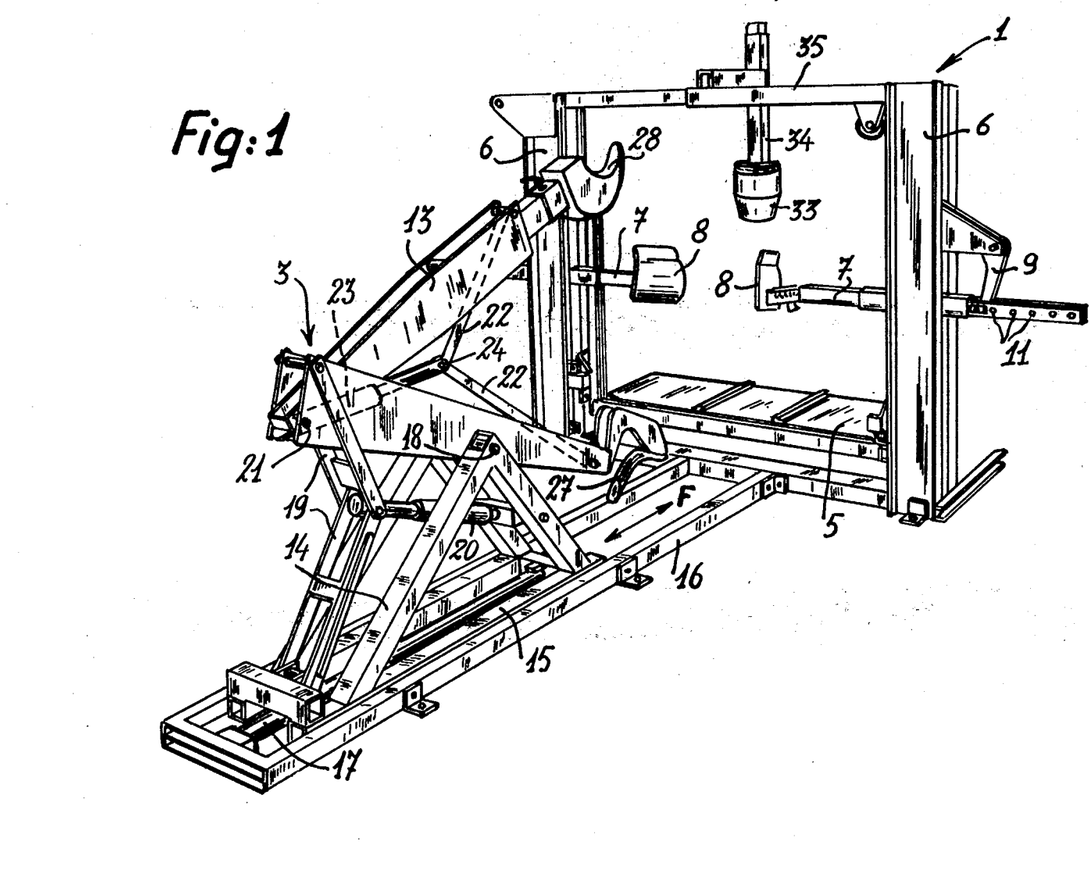
FIG. 1 is a perspective view of the complete apparatus with its various accessories.
Figure 2:
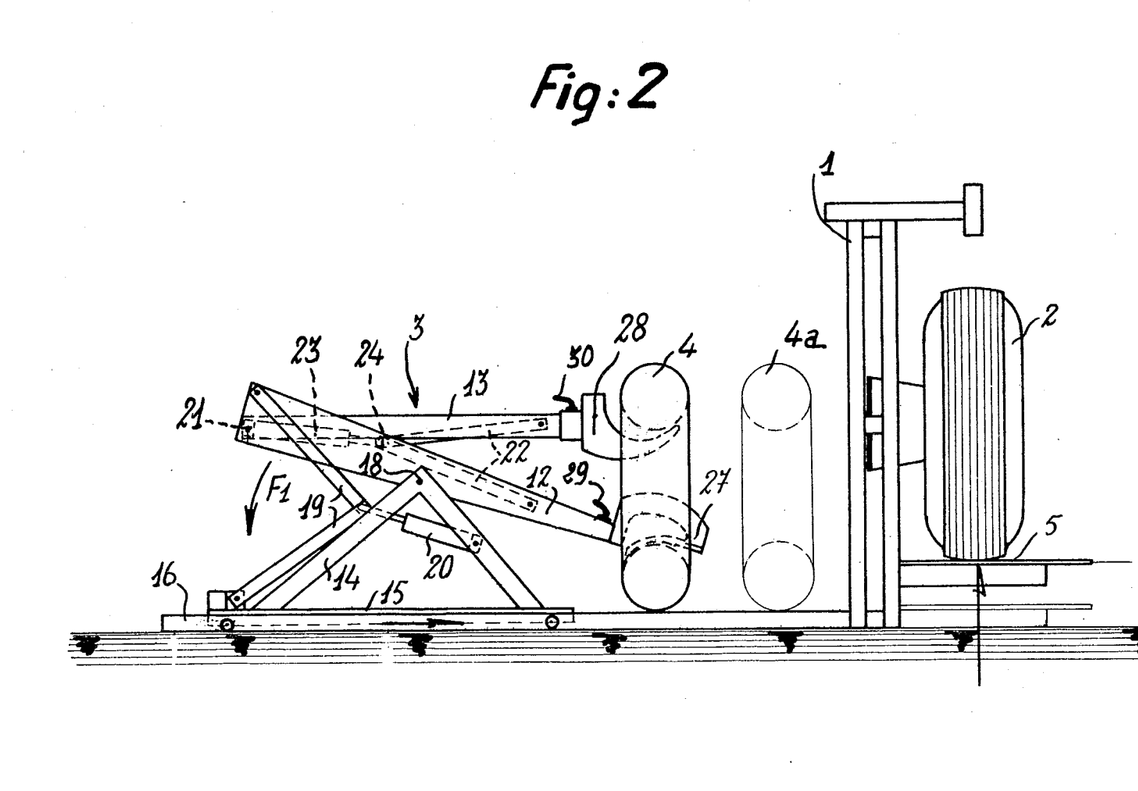
FIG. 2 is a diagrammatic side elevational view of the apparatus, showing the positioning of an unpuncturable inner tube on the pair of extension arms.

The following procedure is adhered to for fitting an unpuncturable inner tube 4 into the pneumatic tire 2:

The angular relative position of the arms 12 and 13 is reduced to its minimal value and these arms are inclined downwardly so that the inner tube 4 can be placed in front of the claws 27, 28 in position 4a (see FIG. 2), and then inserted thereon, so that the claws 27, 28 lie inside the central aperture of tube 4.

Figure 5:
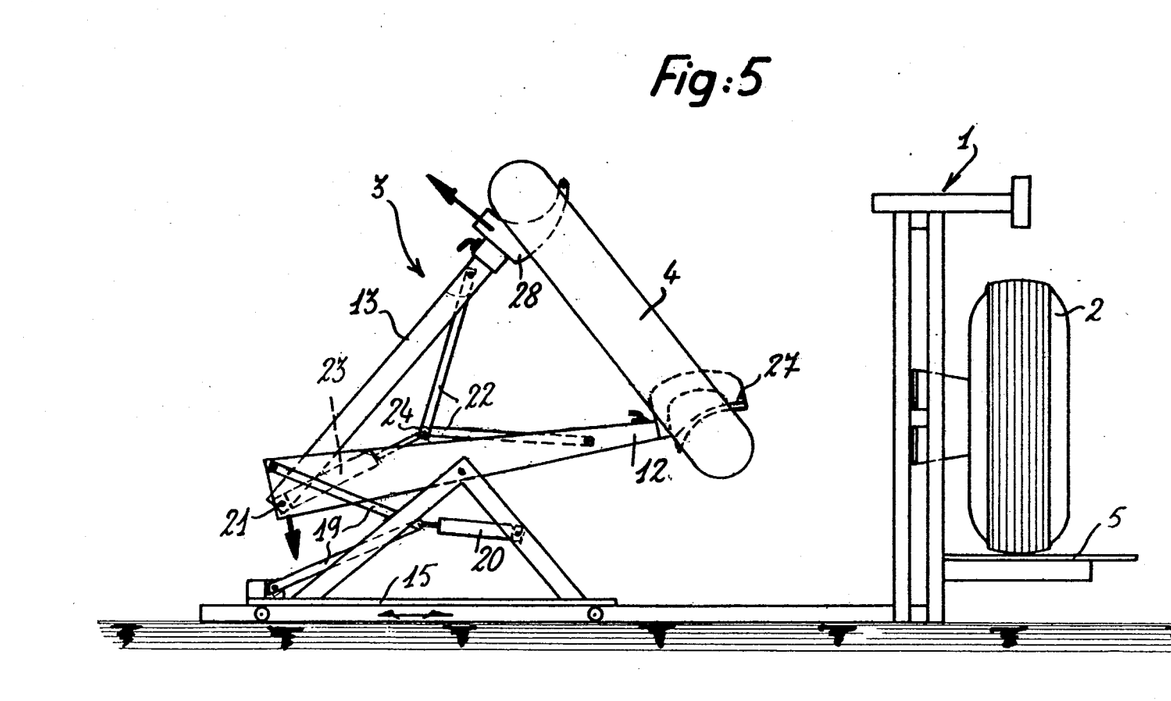

The cylinder 20 is then actuated in order to move the extension system 12, 13 backwards to the position shown in FIG. 5, whereafter the two arms 12, 13 are divaricated by actuating the cylinder 23. Thus, the claws 27, 28 stretch the two opposing portions of tube 4 away from each other, so that the inner tube is extended in the longitudinal direction of the apparatus, i.e. along an axis perpendicular to the general median plane of the tire (see FIG. 5), and assumes an oval shape while reducing the cross-section of the two corresponding tube sides. Under these conditions, the overall transverse dimension of the unpuncturable inner tube is reduced to a value inferior to the diameter of the central aperture of the pneumatic tire 2, so that the inner tube can be introduced into this tire.

Figures 3, 6:
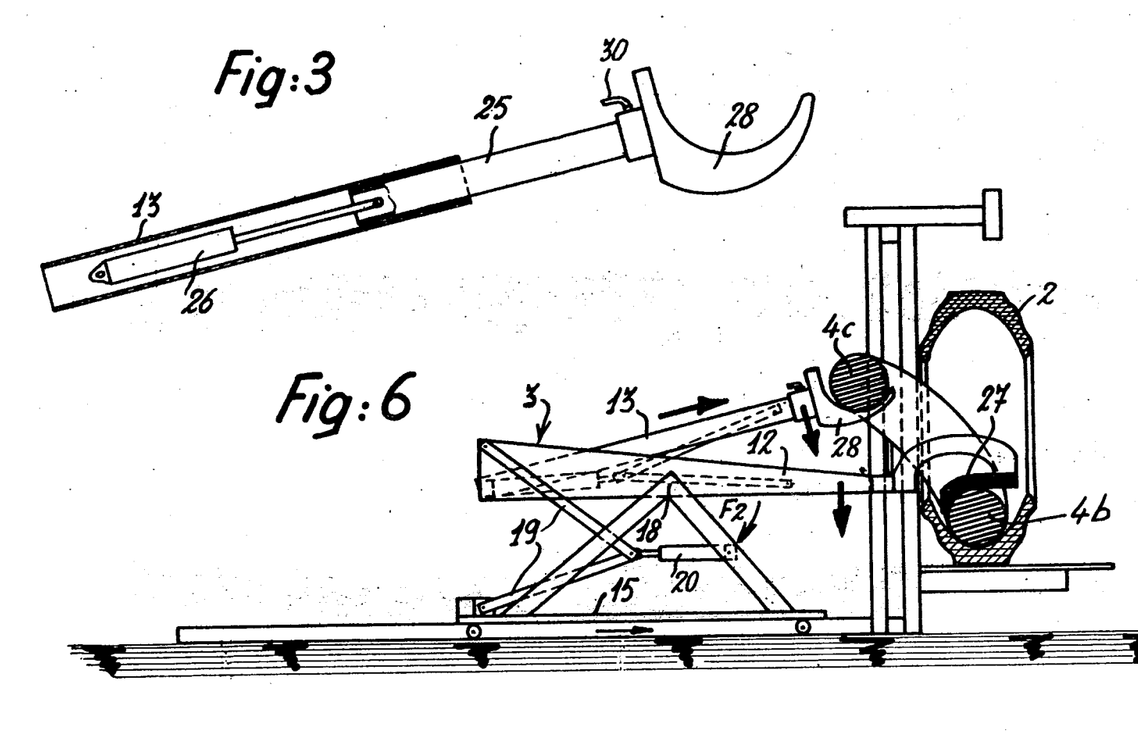
FIG. 3 is a fragmentary axial longitudinal section showing a detail.
FIGS. 5 to 7 are views similar to FIG. 2 but showing the various successive steps of the operation consisting in fitting an unpuncturable inner tube into a pneumatic tire.

This introduction is accomplished by firstly moving the handling device 3 towards the tire 2; this is obtained by causing the carriage 15 to roll on the frame 16 under the control of cylinder 17. At the same time, the extension system 12, 13 is caused to tilt downwardly by pivoting in the direction of the arrow $F_2$, so as to introduce the foremost and lowermost portion 4b of the inner tube into the lower portion of tire 2, as shown in FIG. 6. In this respect, it may be pointed out that the end of the lower arm 12 of the extension system is used for pushing the front portion 4b of inner tube 4 and guide same until it is properly fitted against the bottom of the lower portion of the tire 2.

Figure 7:
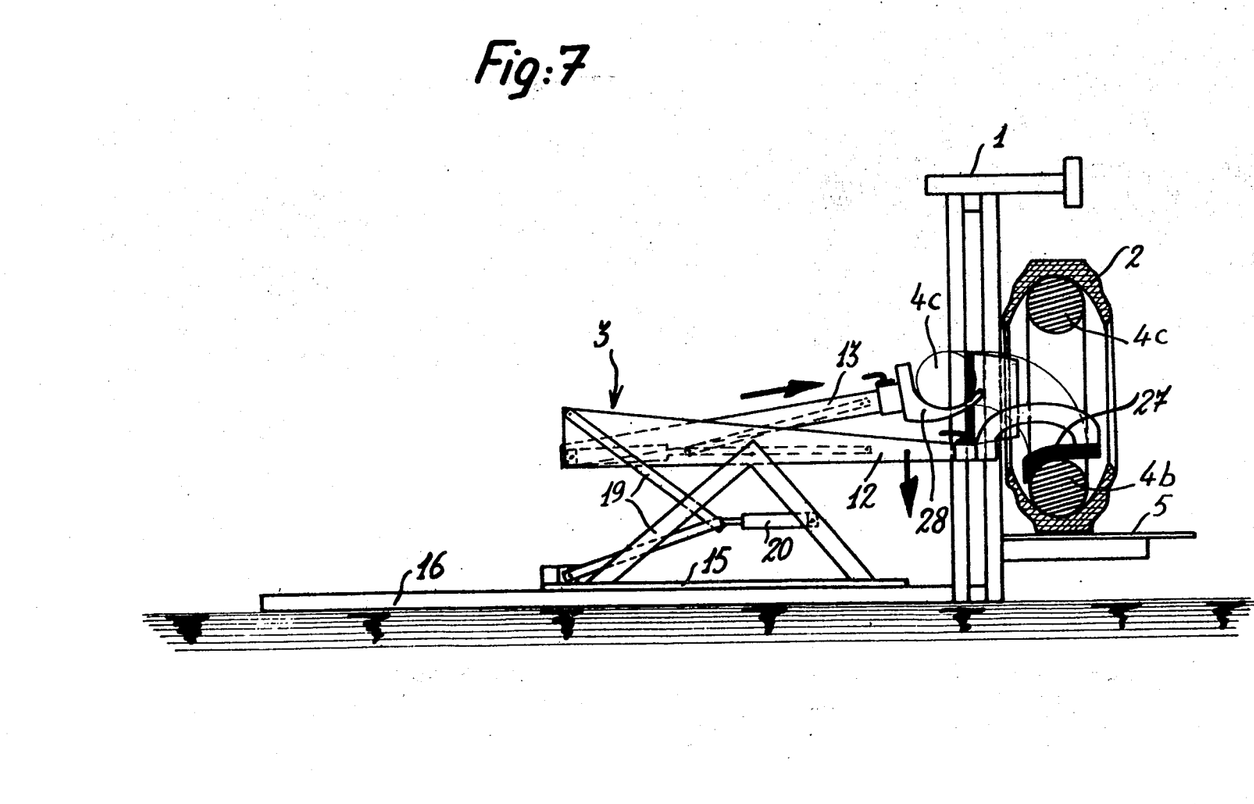

Finally, the remaining portion of the unpuncturable inner tube 4 is also introduced into the tire by pushing the opposite end 4c of the inner tube into the upper portion of the tire while gradually reducing the extension maintained until then on this inner tube. This is obtained by moving the two arms 12 and 13 towards each other (see FIGS. 6 and 7) and pushing the upper end 4c of tube 4 by means of the upper arm 13 of the extension system. To this end, the extension-piece 25 of this upper arm is actuated by means of the corresponding cylinder 26, until the claw 28 can push and guide the upper portion 4c of the tube into the upper portion of tire 2. Finally, the inherent elasticity of the inner tube 4 will cause this inner tube to snap by itself to its final requisite position in the tire.

From the foregoing, it is clear that the various steps to be performed by the operator are relatively simple and may be controlled completely from a central station where the controls for the various cylinders of the apparatus are assembled. These steps obviously do not require any effort from the operator. At the most, before commencing the operations the inner tube 4 must be placed on the two claws 27, 28, whereafter all the other steps are controlled from the central stations through the medium of the various fluid-actuated cylinders.

Another important feature of this apparatus is that it can be used for fitting a relatively wide range of tire and tube sizes. In fact, in contrast to some of the known apparatus designed for this purpose, the apparatus of the invention does not include any member or device of which the dimensions are compulsorily subordinate to a predetermined tire size. In the present case, it is only necessary to adjust the positions of the various movable elements of the apparatus for changing from one tire and tube size to another.

Another essential advantage characterizing this apparatus lies in the fact that it can be used not only for fitting an unpuncturable inner tube into a pneumatic tire to be equipped with such an inner tube, but also for removing the tube from the tire. To this end, the present apparatus comprises detachable accessories specially designed for performing this inner tube removing operation.

Figure 8:
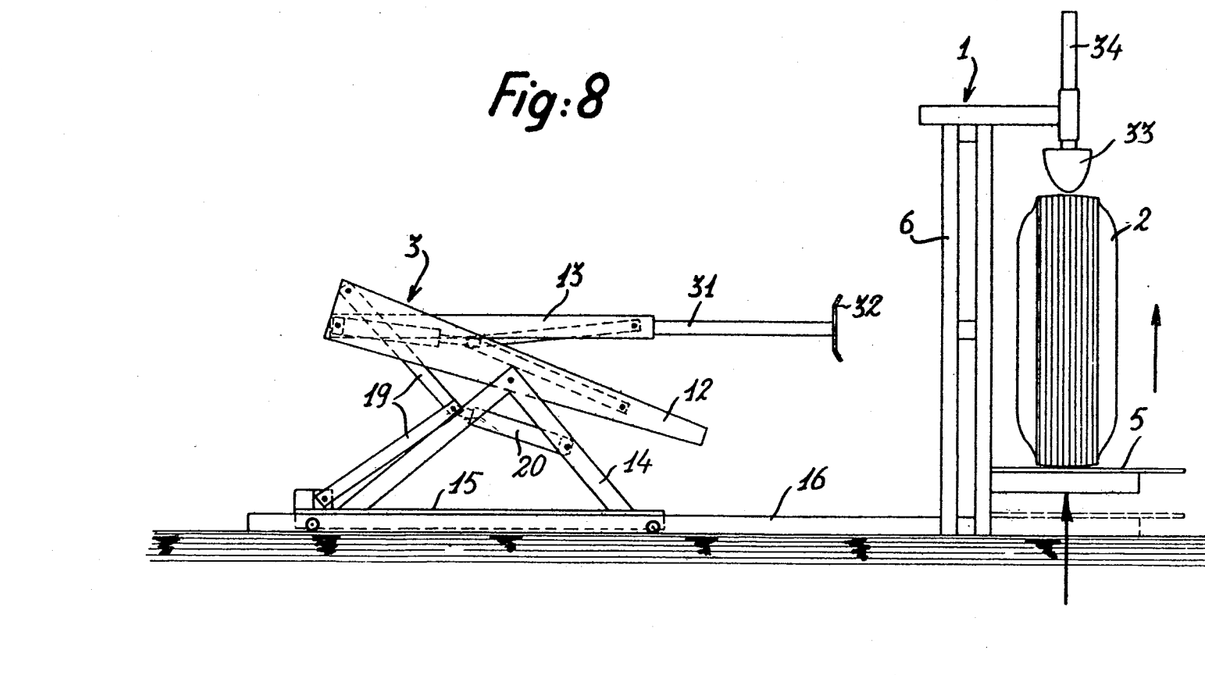
FIG. 8 is a view similar to FIG. 2 but showing the transformation of the apparatus prior to the removal of an unpuncturable inner tube.

One of the accessories consists of a push arm 31 provided with a bearing plate 32. This push arm 31 is adapted to be fitted to the outer end of the upper arm 13 of the tube handling device 3, as illustrated in FIG. 8. One of these other accessories intended for removing the unpuncturable inner tube consists of a bearing member 33 of substantially ogival configuration, carried by a bar 34. This bar 34 is shaped to permit the mounting of this bearing member 33 on the cross member 35 of the gantry frame 1. It is thus possible to cause this member 33 to exert a pressure against the upper portion of the tire 2 from which the unpuncturable inner tube is to be removed (see FIG. 8).

Figure 11:
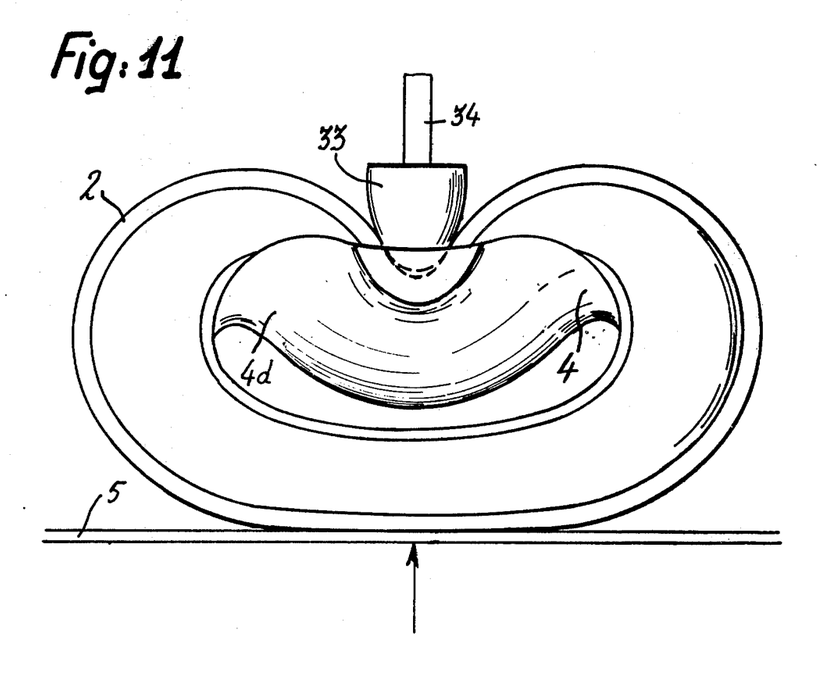
FIG. 11 is a front elevational view showing on a larger scale a tire partially crushed during the steps of the tube removal.

To remove this inner tube, the bed plate 5 is firstly raised in order to change the shape of the upper portion of the tire. In fact, this causes the ogival member 33 to be sunk into the upper portion of the tire, so that the corresponding portion 4d of the inner tube 4 will project into the central aperture of the tire, as shown in FIG. 11.

While maintaining the tire 2 and inner tube 4 in this shape (FIG. 8), the plate 32 of push arm 31 is caused to engage the uncovered portion 4d of inner tube 4 and as this arm 31 continues its forward movement obtained by properly controlling the carriage 15, the upper portion 4d of inner tube 4 is eventually pushed out from the tire 2 (as shown in FIG. 9), whereafter the complete unpuncturable inner tube is removed from the tire (FIG. 10).

It should be noted that the thrust exerted on the unpuncturable inner tube can be obtained either by simply moving the carriage 15 and the handling device 3, or by extending the push arm 31 by actuating the cylinder 26 enclosed in the upper arm 13 of the extension system, or alternatively by combining these two actions.

It may also be noted that, as in the case of an inner tube fitting operation, the present apparatus can be used for removing unpuncturable inner tubes equipping tires of different sizes. In fact, it is only necessary to adapt the positions of the various members of the apparatus to the specific size of the corresponding tire.

Due to its particular conception, with the apparatus of this invention even unskilled hands are capable of fitting or removing an unpuncturable inner tube with respect to the corresponding pneumatic tire, very easily and without effort, irrespective of the tire size.

Of course, the invention should not be construed as being strictly limited by the specific form of embodiment illustrated and described herein, since this form of embodiment is given by way of illustration, not of limitation. Thus, it is clear for anybody conversant with the art that the apparatus may comprise different mechanical means for controlling on the one hand the tilting of the extension system on its support, and on the other hand the divarication of the two arms of this system. Thus, for this last-mentioned action, it would be possible to provide a fluid-actuated cylinder interconnecting directly the two free or outer ends of these two arms. Similarly, the tilting movement of the extension arm system could be controlled by a fluid-actuated cylinder connecting the lower arm thereof to the carriage 15. In any case, any other suitable and known mechanical control means may also be contemplated. On the other hand, the movements of the carriage 15 could also be controlled by means other than those illustrated and described herein, without departing from the basic principles of the invention.

Regarding the initial deformation of the pneumatic tire in order to permit the removal of an unpuncturable inner tube therefrom, it could be obtained by lowering the bearing member 33 while leaving the lower bed plate 5 in a fixed position instead of lifting this bed plate. But also in this case, many other modifications may be contemplated without departing from the domain of the invention as set forth in the appended claims.

What is claimed as new is:

1. A method of fitting a so-called "unpuncturable" inner tube into a pneumatic tire by introducing the inner tube through the central aperture of one of the side faces of the tire, comprising the steps of holding the tire in a gantry-like structure in substantially vertical position; positioning the inner tube in front of the tire face on two arms of an inner tube handling device which are inclined with respect to each other; extending the inner tube along an axis perpendicular to the general median plane of the tire by changing the inclination of the two arms; moving the inner tube handling device on a carriage toward the inner tube while maintaining the extension of the latter to insert the front end of the elongated tube into an adjacent portion of ythe tire; and subsequently pushing the other end of the tube into the opposing portion of the tire by releasing the extension effort.

2. A method as claimed in claim 1, wherein for exerting said extension effort on the inner tube the latter is positioned between the outer ends of the two arms of the tube handling device.

3. An apparatus for carrying out the method according to claim 2, which cmprises a gantry-like frame structure adapted to hold a pneumatic tire in a vertical position, an inner tube handling device disposed in front of said gantry-like frame structure and comprising a pair of extension arms pivotally interconnected at one end and disposed in a plane perpendicular to the median plane of the tire, said inner tube handling device being tiltably mounted on a carriage adapted to move towards and away from said gantry-like frame structure, a plurality of means for controlling the angular relationship between said extension arms, the tilting of said extension arms and the movements of said carriage.

4. An apparatus as claimed in claim 3, which further comprises of pair of claws each adapted to be adjustably fitted to the outer end of one of said extension arms, said claws being adapted to engage the inner circumference of said inner tube to be fitted into said pneumatic tire.

5. An apparatus as claimed in claim 4, which further comprises means for removing an unpuncturable inner tube from a pneumatic tire, said means comprising on the one hand a member adapted to crush partially the pneumatic tire on the gantry-like frame structure holding said tire in a vertical position, so as to cause one portion of the inner tube fitted therein to project into the central aperture of said tire, and on the other hand a push bar adapted to be fitted to the end of the upper one of said pair of extension arms, so as to exert a thrust against the thus projecting portion of the inner tube to be removed.

6. An apparatus as claimed in claim 5, which further comprises means for causing said member to partially crush the pneumatic tire on the gantry-like frame structure holding said tire, said means consisting of a lower, vertically movable bed plate, said member being mounted above said bed plate, having a substantially ogival shape and being adapted to penetrate into the upper portion of the tire during the upward movement of said lower bed plate.

7. An apparatus as claimed in claim 6, wherein the lower arm of said pair of extension arms is pivoted to a support mounted on said carriage of the handling device, the tilting movement of said pair of extension arms being controlled by a fluid-actuated cylinder acting upon a pair of pivoted links having their ends pivoted the one to said carriage and the other to the lower arm of said pair of extension arms.

8. An apparatus as claimed in claim 7, wherein the angular relationship of said pair of extension arms is controllable by means of a fluid-actuated cylinder also controlling a pair of pivotally interconnected links having their ends pivoted each to one arm of said pair of extension arms.

9. An apparatus as claimed in claim 8, wherein said gantry-like frame structure holding the pneumatic tire in a vertical position comprises a pair of plates for elongating the central aperture of the tire in the horizontal direction, said plates being carried by a pair of horizontal bars slidably mounted in turn in the vertical uprights of said gantry-like frame structure and operable by means of fluid-actuated cylinders.

* * * * *